(No Model.)

M. E. GRISWOLD.
SAW MILL.

No. 442,665. Patented Dec. 16, 1890.

Witnesses:
J. Halpenny
F. J. Le Moyne

Inventor:
Marcus E. Griswold
by
Louis V. Le Moyne
his Atty

UNITED STATES PATENT OFFICE.

MARIUS E. GRISWOLD, OF CHICAGO, ILLINOIS.

SAW-MILL.

SPECIFICATION forming part of Letters Patent No. 442,665, dated December 16, 1890.

Application filed May 7, 1890. Serial No. 350,861. (No model.)

*To all whom it may concern:*

Be it known that I, MARIUS E. GRISWOLD, a citizen of the United States, residing at Chicago, Cook county, Illinois, have invented a new and useful Improvement in Saw-Mills, of which the following is a specification.

The object of my invention is to provide a simple and easy-running hand-power saw-mill light enough to be readily moved about and designed particularly for ripping lumber.

It consists, broadly, in a novel arrangement of parts and a process of operation by means of which the material is cut smoothly and evenly with the grain without tearing the fiber.

It further consists of details of construction and operation hereinafter more fully described, and particularly pointed out in the claims.

The usual practice heretofore has been to locate the shaft upon which the saw is mounted below the surface of the feed-table with the saw projecting above it and the material that is being cut fed to the saw above its center. In order to give a saw of small diameter sufficient projection to cut lumber of thick size, it is necessary to locate the axle of the saw as near to the top of the feed-table as possible, and the lumber is therefore fed to it in almost a direct line with its center, and the saw, regardless of the direction of rotation, cuts almost directly across the grain of the wood. This, it is found, tears the fiber and leaves one edge rough and frayed. Only in case the lumber is thick enough to bring its upper edge well up to the periphery of the saw and the saw is made to rotate in the direction the lumber moves will the teeth leave the edge at such an angle as to cut smoothly without fraying. These difficulties I aim to obviate in my improved machine, as hereinafter described.

Figure 1:
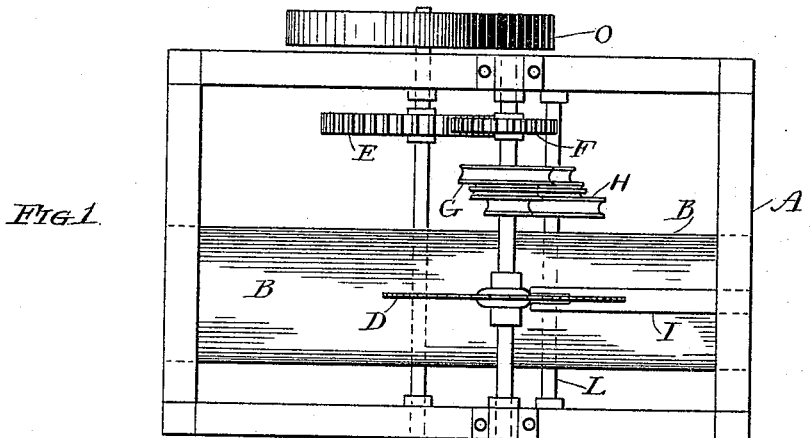
Figure 2:
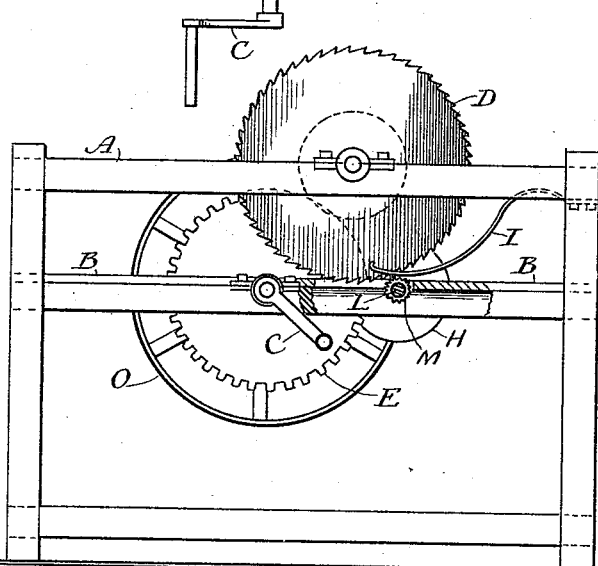
Figure 3:
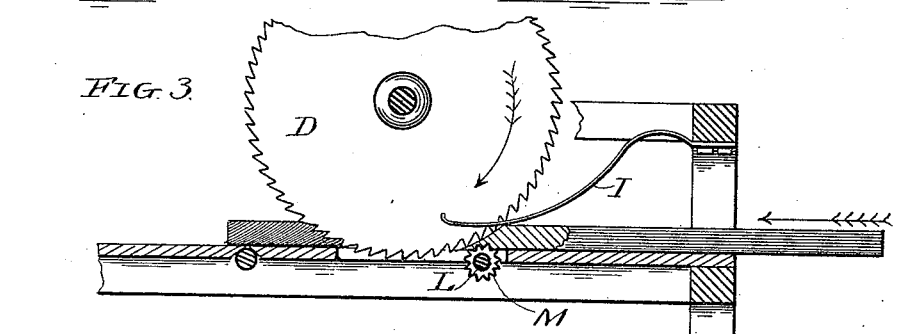
Figure 4:
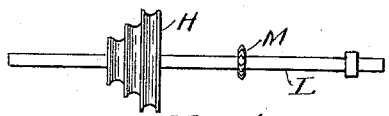

Figure 1 is a plan view of my machine. Fig. 2 is a side elevation of the same. Fig. 3 is an enlarged detail view of a part of the machine, showing a piece of lumber in the process of being cut and partially broken away to show the saw. Fig. 4 is a detail view of the feed-roll.

A represents the frame of the machine; B, the feed-table; C, the crank by which the machine is operated; D, the saw; E, the driving-gear meshing with the gear F on the shaft upon which the saw is mounted.

G and H are speed-pulleys for driving the feed-roll L at different speeds.

M is the spur upon the feed-roll.

I is the presser-foot.

O is the fly-wheel.

The material to be sawed is fed in upon the table B between the presser-foot and the feed-roll. The table is located below the saw and at such a distance from its center as to bring its upper surface just within the periphery of the saw, so that the saw just passes through the material upon the table which is being sawed. The saw is rotated in the direction in which the lumber is fed. By this arrangement the teeth of the saw cut with the fiber of the wood or, more properly speaking, diagonally across it, as plainly shown in Fig. 3, leaving the under side at an acute angle, without regard to the thickness of the material operated upon, instead of cutting straight across it, as in the usual form of machine, thus making a smooth and easy running machine which does not tear the fiber or fray the lower edges of the lumber. The saw, revolving in the direction the lumber is fed, assists greatly in the feeding, having a tendency to feed itself, so that in some classes of work it is found that the feed-roll is required to retard its advance in order to prevent the saw from choking. This necessarily results in a great saving of power over a machine in which the material has to be fed in against a saw which rotates in the opposite direction.

I locate my feed-roll close up under the saw, as close as possible without interfering, and with the spurs M projecting above the table in a direct line with the plane of the saw, so that the wood that is punctured by the spurs will be cut out by the saw. By thus locating the feed-roll close up under the saw the lumber is fed clear through to the end without the assistance of another piece. The speed of the feed-roll may be varied to suit different classes of work by shifting the belt on the speed-pulleys G and H.

The bifurcated presser-foot I holds the lumber down upon the feed-roll and keeps it in position. A guide may be put upon the feed-table, if desired.

My machine is designed particularly for hand-power use for light work in buildings and shops, and is intended to be light enough to be readily moved about; but, if desired, the crank C may be replaced by a pulley and the machine run by steam-power.

What I claim, and desire to secure by Letters Patent, is—

1. The herein-described saw-mill, consisting of the combination of the circular saw D, rotating in the direction the lumber is fed, the feed-table B, located below the saw and just within the periphery of the same, the feed-shaft L, located below said table, with the spurs M projecting above it in close proximity to the saw and in the same plane, the presser-foot I above the shaft L, and mechanism for driving the feed-shaft at varying speeds, all substantially as shown and described.

2. In a saw-mill, the herein-described feed mechanism, consisting of the feed-shaft L, located below the saw and below the feed-table, the spurs M upon said shaft, projecting above said table in close proximity to the saw and in the same plane, the bifurcated presser-foot I, located above said shaft, and the speed-pulleys for driving said shaft at varying speeds, all substantially as shown and described.

MARIUS E. GRISWOLD.

Witnesses:
FRANCIS J. LE MOYNE,
LOUIS V. LE MOYNE.